(12) United States Patent
Schoerrig

(10) Patent No.: US 8,606,466 B2
(45) Date of Patent: Dec. 10, 2013

(54) METHODS AND DEVICES FOR CONTROLLING A PRECRASH SAFETY SYSTEM IN A MOTOR VEHICLE

(71) Applicant: Oliver Schoerrig, Neubiberg (DE)

(72) Inventor: Oliver Schoerrig, Neubiberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/625,476

(22) Filed: Sep. 24, 2012

(65) Prior Publication Data

US 2013/0073149 A1    Mar. 21, 2013

Related U.S. Application Data

(63) Continuation of application No. PCT/EP2011/054149, filed on Mar. 18, 2011.

(30) Foreign Application Priority Data

Mar. 25, 2010  (DE) .......................... 10 2010 003 297

(51) Int. Cl.
  *B60R 22/00*   (2006.01)
(52) U.S. Cl.
  USPC .................. 701/45; 701/46; 701/47; 701/48; 701/49
(58) Field of Classification Search
  USPC ...................................... 701/45–49
  See application file for complete search history.

(56) References Cited

U.S. PATENT DOCUMENTS

| | | | |
|---|---|---|---|
| 7,458,535 B2 * | 12/2008 | Holbein et al. | 242/375.2 |
| 8,136,834 B2 * | 3/2012 | Fredriksson et al. | 280/730.2 |
| 2001/0054816 A1 | 12/2001 | Brambilla et al. | |
| 2003/0060980 A1 * | 3/2003 | Prakah-Asante et al. | 701/301 |
| 2003/0139865 A1 | 7/2003 | Prakah-Asante et al. | |
| 2004/0059487 A1 * | 3/2004 | Lich et al. | 701/45 |
| 2005/0065688 A1 * | 3/2005 | Rao et al. | 701/45 |
| 2005/0080530 A1 * | 4/2005 | Arduc et al. | 701/37 |
| 2005/0252708 A1 * | 11/2005 | Theisen | 180/268 |
| 2007/0228704 A1 * | 10/2007 | Cuddihy et al. | 280/735 |

(Continued)

FOREIGN PATENT DOCUMENTS

| | | |
|---|---|---|
| DE | 199 46 407 A1 | 4/2001 |
| DE | 199 60 644 A1 | 6/2001 |

(Continued)

OTHER PUBLICATIONS

International Search Report for PCT/EP2011/054149 retrieved from WIPO mailed Jul. 2011.*

(Continued)

*Primary Examiner* — Calvin Cheung
(74) *Attorney, Agent, or Firm* — Crowell & Moring LLP

(57) ABSTRACT

In a method for controlling at least one reversible occupant protection measure of a precrash safety system, in particular a reversible belt tensioner, a plurality of input signals are received, wherein the input signals indicate a potential risk of an accident. The input signals are mapped onto a plurality of different precrash severity indicators. Each precrash severity indicator indicates an expected probability and/or severity of the accident. The precrash severity indicators are additionally filtered such that upon occurrence of a precrash severity indicator, a subsequent precrash severity indicator is suppressed for a period of time. Then, the at least one reversible occupant protection measure, for example, the belt tensioning, is triggered as a function of the filtered precrash severity indicators.

13 Claims, 2 Drawing Sheets

(56) References Cited

U.S. PATENT DOCUMENTS

| | | | |
|---|---|---|---|
| 2008/0109137 A1 | 5/2008 | Eberle et al. | |
| 2008/0290644 A1* | 11/2008 | Spahn et al. | 280/806 |
| 2010/0282889 A1* | 11/2010 | Hjerpe et al. | 242/374 |
| 2011/0112725 A1* | 5/2011 | Kuttenberger et al. | 701/45 |

FOREIGN PATENT DOCUMENTS

| | | | | |
|---|---|---|---|---|
| DE | 100 05 010 A1 | | 8/2001 | |
| DE | 101 21 386 C1 | | 8/2002 | |
| DE | 102 12 902 A1 | | 10/2003 | |
| DE | 102 12 963 A1 | | 10/2003 | |
| DE | 102004049881 | * | 4/2006 | B60R 22/195 |
| DE | 102005021140 A1 | * | 11/2006 | B60R 21/017 |
| DE | 10 2005 038 226 A1 | | 2/2007 | |
| DE | 602 11 641 T2 | | 5/2007 | |
| DE | 10 2007 038 366 A1 | | 2/2009 | |
| DE | 10 2008 001 781 A1 | | 11/2009 | |
| DE | 102008001781 A1 | * | 11/2009 | B60R 21/134 |
| EP | 1 752 339 A1 | | 2/2007 | |
| EP | 1752339 A1 | * | 2/2007 | B60R 21/15 |
| WO | WO 01/96152 A1 | | 12/2001 | |
| WO | WO2004103782 A1 | * | 12/2004 | B60R 22/44 |

OTHER PUBLICATIONS

EP1752339 English Machine Language translation from WIPO retrieved Apr. 10, 2013.*
DE102004049881 English Machine Language translation from EPO retrieved Apr. 10, 2013.*
JP2009-269602 English Machine Lannguage translation from JPO retrieved Apr. 10, 2013.*
William Strunk Jr. and E.B. White, The Elements of Style, $3_{rd}$ Edition, MacMilillan Publicshing Co., Inc., 1979, all pages.*
International Search Report dated Jul. 20, 2011 with English translation (four (4) pages).
German Search Report dated Aug. 19, 2010 with partial English translation (nine (9) pages).

* cited by examiner

METHODS AND DEVICES FOR CONTROLLING A PRECRASH SAFETY SYSTEM IN A MOTOR VEHICLE

CROSS REFERENCE TO RELATED APPLICATIONS

This application is a continuation of PCT International Application No. PCT/EP2011/054149, filed Mar. 18, 2011, which claims priority under 35 U.S.C. §119 from German Patent Application No. 10 2010 003 297.2, filed Mar. 25, 2010, the entire disclosures of which are herein expressly incorporated by reference.

BACKGROUND AND SUMMARY OF THE INVENTION

The invention relates to the control of occupant protection measures of a precrash safety system in a motor vehicle.

Precrash safety systems are safety systems that implement one or more occupant protection measures in order to better protect the occupants in the event of an accident, when a safety-critical situation, in which it is likely that an accident might follow, is detected. Such occupant protection measures are most likely reversible occupant protection measures—that is, measures that can be reset again after the hazardous situation has ended and can be retriggered again in the event of a new hazardous situation. However, even non-reversible occupant protection measures can be triggered by a precrash safety system.

A typical example of reversible occupant protection measures of a precrash safety system is the seat belt tensioning by means of an electric motor-operated seat belt tensioner (for example, an electric motor-operated seat belt retractor). In contrast to a non-reversible pyrotechnic seat belt tensioner, the force in an electric motor-operated seat belt tensioner is generally significantly less. When the seat belt is tightened, the belt slack is taken out, so that the safety belt better protects the vehicle occupants in the event of an accident. The documents DE 101 21 386 C1, DE 10 2005 038 226 A1, DE 100 05 010 A1 and WO 01/96152 A1 describe some examples of precrash safety systems with belt tensioning.

In order to actuate an occupant protection measure, such as a belt tensioner, a precrash safety system typically evaluates the momentary state of the driving dynamics of the motor vehicle. For example, the precrash safety system can check whether the vehicle is in an oversteering, understeering or even emergency braking situation. In addition, signals from the environment sensors can be evaluated for actuation purposes. For example, the data determined by use of radar can be evaluated in order to predict a collision.

When triggering situations relating to the driving dynamics occur in rapid succession—for example, oversteering in a left-hand curve, driving straight ahead for a short distance, then oversteering in a right-hand curve—a conventional precrash safety system will trigger the belt tensioner every time. This multiple triggering of the belt tensioner—that is, this repeated tensioning operation—in a short period of time may cause the occupants to be annoyed—especially when driving in the top speed range. Moreover, repeated tensioning in a short period of time is not necessary from the viewpoint of occupant safety, because the belt slack is already taken out during the first tensioning operation, and no significant amount of belt slack will form during the driving maneuvers that follow shortly thereafter.

An additional drawback with the conventional precrash safety systems is the lack of scalability to additional input and/or output variables. Precrash safety systems can be expanded on the input side, for example, in the future in such a way that they process the events that are reported by camera-based systems that look ahead. In addition, it would be advantageous if such systems could be easily expanded on the output side to include, in addition to the belt tensioning, other occupant protection measures, such as closing the windows and closing—if present—the sliding roof as well as moving the seat headrest into the upright position.

The object of the present invention is to eliminate the drawbacks of the conventional precrash safety systems.

A first aspect of the invention relates to a method for controlling at least one reversible occupant protection measure of a motor vehicle precrash safety system, in particular a reversible belt tensioner. Not only the control of one or more additional reversible occupant protection measures, but also the control of an additional non-reversible occupant protection measure is contemplated. According to the method, a plurality of input signals are received, wherein the input signals indicate a potential risk of an accident. The input signals are typically sensor signals, from which a critical driving state (for example, oversteering, understeering, emergency braking) or a critical surrounding situation (short distance to collision derived from radar measurements) can be detected. The input signals are mapped onto precrash severity indicators. Preferably, each input signal is assigned a precrash severity indicator. Each precrash severity indicator indicates an expected probability and/or severity of the accident. In determining the precrash severity indicator as a function of an input signal, which is not a binary signal, a threshold value comparison is typically also performed. The precrash severity indicators have varying priorities and are set as a function of the input signals.

According to the method, the precrash severity indicators are preferably also filtered, a feature that is also referred to below as "temporal debouncing". The filtering is carried out in such a manner that upon occurrence of a precrash severity indicator, a subsequent precrash severity indicator is suppressed for a period of time (that is, temporarily). In this way it is possible to avoid unnecessary multiple triggering actions for a short period of time. Preferably, only one precrash severity indicator having an equally high or lower priority than the priority of the previous precrash severity indicator is suppressed, while a precrash severity indicator having a higher priority than the priority of the previous precrash severity indicator is not suppressed. This feature makes it possible for a precrash severity indicator having a correspondingly high priority to be able, nevertheless, to trigger an occupant protection measure of the precrash safety system.

Then the at least one reversible occupant protection measure, such as belt tensioning, is triggered as a function of the filtered precrash severity indicators. At the same time each filtered precrash severity indicator or each filtered precrash severity indicator from a subset of the filtered precrash severity indicators is assigned one or more actuators of the precrash safety system—for example, a defined force characteristic of the electric motor-operated belt tensioner, the window closing mechanism and/or the seat adjuster (moving the seat headrest into the upright position).

The method according to the invention provides that the individual input data from the various sensor systems—for example, from the internal (that is, relating to the driving dynamics) and from the external (that is, environment sensing) sensor systems—are coordinated and prioritized in such a way that a situation, in which unnecessary multiple triggering actions occur, does not arise.

Owing to the filtering of the precrash severity indicators, whereby the subsequent precrash severity indicators are suppressed, the brief safety-critical events that take place in succession one after the other, such as emergency braking followed by oversteering, do not result in an unnecessary multiple triggering of the occupant protection measure, such as the belt tensioning.

Furthermore, the prioritizing of the precrash severity indicators permits that not all of the subsequent precrash severity indicators are suppressed within a time frame, but rather correspondingly high-ranking precrash severity indicators are not suppressed and, thus, can still result in the triggering of the occupant protection measure.

In addition, the use of the precrash severity indicator as an abstract variable allows the sensor and the actuator of the precrash safety system to be uncoupled, so that it is easier to integrate additional input and/or output signals into the system. As a result, the precrash safety system can be easily expanded.

Preferably, the filtering of the precrash severity indicators is carried out by means of a countdown timer. In this case a countdown timer is set preferably to a predefined value upon occurrence of the (earliest) precrash severity indicator. The occurrence of the precrash severity indicator also causes the countdown timer to start running (for example, the countdown timer starts to run at the time that the set precrash severity indicator ends). Then the countdown timer runs from the predefined value in the direction of an end value (for example, the value 0). As long as the countdown timer is running, all precrash severity indicators having an equally high or lower priority are preferably suppressed. However, the countdown timer is preferably reset (thus, set to the starting value), when a precrash severity indicator having an equally high or lower priority than the priority of the previous precrash severity indicator occurs before the end value is reached.

A second aspect of the invention relates to a device for controlling at least one reversible occupant protection measure of a precrash safety system. In this case the features of the device according to the invention correspond in essence to the features of the above-described method according to the first aspect of the invention. The device according to the invention receives a plurality of input signals, from which a potential risk of an accident can be derived. The device maps the plurality of input signals to precrash severity indicators. The result is that each precrash severity indicator indicates an expected probability and/or severity of the accident. Furthermore, the precrash severity indicators have different priorities and are set as a function of the input signals. Furthermore, the device filters the precrash severity indicators in such a way that upon occurrence of a precrash severity indicator, a subsequent precrash severity indicator is suppressed for a period of time. The at least one reversible occupant protection measure can be actuated as a function of the filtered precrash severity indicators.

The above descriptions of the method and the advantageous embodiments of the method according to the invention also apply correspondingly to the control device according to the invention.

A third aspect of the invention relates to a method for controlling a reversible seat belt tensioner (for example, an electric motor-operated seat belt retractor) of a motor vehicle. According to the method, one or more input signals are received, whereby the input signals indicate a potential risk of an accident. In this respect see the above statements that have already been made within the scope of the description of the first aspect of the invention. The belt tensioner is triggered, when a first input signal of one or more input signals indicates a higher risk of an accident. Then a repeated triggering of the belt tensioner is suppressed for a certain period of time when an input signal—for example, a first input signal—indicates once again a higher risk of an accident.

The method according to the invention prevents the belt tensioner from being triggered multiple times.

As, however, described above with respect to the first aspect of the invention, the suppression does not occur preferably in every case, but rather only for input signals with a correspondingly low priority. For this purpose the plurality of input signals are assigned preferably different priorities. This assignment can also be implemented, for example, indirectly by assigning different precrash severity indicators to the input signals. In this case a repeated triggering of the belt tensioner is suppressed when an input signal, which is assigned an equally high or lower priority than the assigned priority of the first input signal, indicates a higher risk of an accident.

The suppression of a repeated triggering of the belt tensioner is carried out, for example, by use of a countdown timer. The triggering of the belt tensioner initiates, for example, the start of the countdown timer from a starting value in the direction of an end value (for example, 0). As long as the countdown timer is running, a renewed triggering of the belt tensioner is suppressed (at least in the case of the input signals that have the same or a lower priority than the input signal that has generated the earlier triggering action). The countdown timer is preferably reset, when a corresponding input signal having an equally high or lower priority than the priority of the input signal that has generated the earlier triggering action occurs before the end value is reached.

The above descriptions of the method according to the first aspect of the invention and the advantageous embodiments of this method also apply correspondingly to the inventive method according to the third aspect of the invention.

Furthermore, the invention also relates to a control device that is intended for controlling a belt tensioner and that works according to the method according to the third aspect of the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
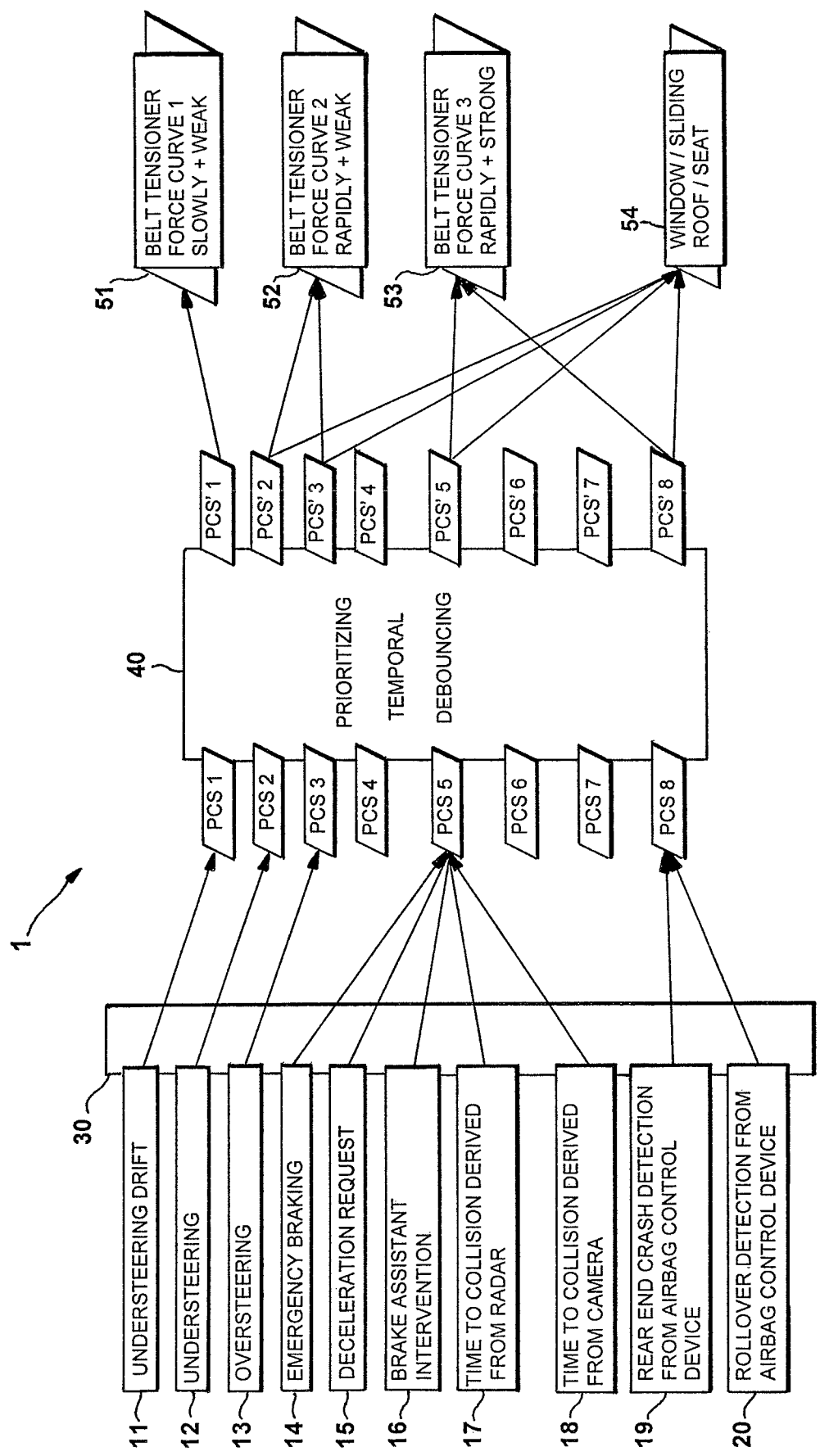
FIG. 1 shows an exemplary embodiment of the invention for actuating occupant protection measures of a precrash safety system.

FIG. 1 shows an exemplary control device 1 of a precrash safety system. The control device processes the input signals 11-20, coming from a plurality of sources, in order to actuate actuators of the precrash safety system as a function of the processed input signals 11-20. The control device prioritizes the safety-relevant events, which can be derived from the input signals, and performs a temporal debouncing—that is, a suppression of the detected events, which shortly thereafter follow the safety-critical event and do not have a higher priority—in order to prevent a certain actuator of the safety system—for example, an actuator of the belt tensioner—from being triggered multiple times, a state that the driver would find to be annoying.

In FIG. 1, examples of some input signals 11-20, which are evaluated by the control device 1 in order to actuate the actuators of the precrash system, are shown on the left. From these input signals 11-20 it is possible to derive a potential risk of an accident. That is, these input signals are used to indicate a potential risk of an accident. These input signals 11-20 can be in part or in total bivalent input signals that indicate in binary form whether a certain safety-critical event is present (or its future occurrence is presumed) or not. For example, an input signal can indicate in a binary manner whether a driver-initiated emergency braking is being carried out or not. As an alternative, the input signals 11-20 can also be in part or in total non-binary input signals that are checked via a threshold value comparison as to whether a certain safety-critical event is present (or its future occurrence is presumed) or not. For example, an input signal can indicate the amount of the brake pedal pressure that is then checked by means of a threshold value comparison as to whether an emergency braking is present or not. Threshold value comparisons that still have to be carried out, if desired, are indicated by the block 30 in FIG. 1. The individual signals at the output of block 30 are, for example, 1-bit wide signals.

The input signals 11-20 indicate directly or, if desired, by way of a threshold value comparison that still needs to be carried out, whether the following safety-critical events are present:

(a) signal 11: understeering and drifting of the vehicle;
(b) signal 12: understeering;
(c) signal 13: oversteering;
(d) signal 14: emergency braking (here the signal 14 indicates, for example, the brake pedal pressure that is evaluated via a threshold value comparison);
(e) signal 15: presence of a deceleration request by a brake assistant, as a result of which the vehicle is decelerated without any action on the part of the driver (here the signal 15 indicates, for example, the requested deceleration that is evaluated via a threshold value comparison);
(f) signal 16: intervention of the brake assistant in order to reinforce the driver's deceleration request;
(g) signal 17: a potentially imminent collision based on the radar data (here the signal 17 indicates, for example, the time to the collision that is measured with radar and that is then compared with a threshold value—for example, 300 ms);
(h) signal 18: a potentially imminent collision based on the camera data (here the signal 18 indicates, for example, the time to the collision that is measured with a camera system and that is then compared with a threshold value—for example, 300 ms);
(i) signal 19: a rear end accident, which has actually taken place, by retrieving data from the airbag control device; and
(j) signal 20: a rollover, which has actually taken place, by retrieving data from the airbag control device.

Then, the input signals 11-20 are mapped (if desired, after a threshold value comparison 30) in a parameterizable manner to different levels PCS 1-8 of the abstract variable "precrash severity indicator" (PCS); in FIG. 1 the mapping is illustrated by use of the arrows. FIG. 1 shows by way of example eight different precrash severity indicators that do not necessarily also have to be linked to all of the input signals so that precrash severity indicators can be reserved for input variables that are to be added in the future (in FIG. 1, for example, PCS 4, PCS 6 and PCS 7 are not currently in use). The different precrash severity indicators have a fixed priority according to their respective number and indicate thereby an expected probability and/or severity of the accident (that is, a high number corresponds to a high probability of an accident and/or severity of the accident). Each precrash severity indicator PCS 1-8 is assigned a set of actuators that can be parameterized in the control device—in this case, for example, a defined force characteristic of the electric motor-operated belt tensioner (see reference numerals 51-54) the window closing mechanism (see reference numeral 54) and/or the seat adjuster (see reference numeral 54).

If the conditions for a safety-critical event, which is linked to the signals 11-20, are met, then the precrash severity indicator PCS 1-8, assigned to this input signal, is set in the control device. If, therefore, for example, the conditions for an oversteering of the vehicle are met (see signal 13), then the precrash severity indicator PCS 3 is set according to FIG. 1.

In block 40, a prioritizing of the precrash severity indicators PCS 1-8 is performed such that a precrash severity indicator with a high priority overwrites a precrash severity indicator with a lower priority. Preferably only one single precrash severity indicator is available at any given point in time at the output of block 40. Overwriting is done preferably by forming the maximum value. In this case the maximum (that is, the highest prioritized precrash severity indicator) of all precrash severity indicators available at the input is available at the output of block 40 taking into consideration the described temporal debouncing.

Furthermore, a temporal debouncing of the precrash severity indicators PCS 1-8 takes place in block 40. For this purpose, the precrash severity indicators PCS 1-8 are filtered in block 40 in such a way that upon the occurrence of a precrash severity indicator certain subsequently occurring precrash severity indicators are temporarily suppressed. As a result, precrash severity indicators having an equally high or lower priority than the priority of the previous (not suppressed) precrash severity indicator are suppressed. However, precrash severity indicators having a higher priority than the priority of the previous precrash severity indicator are not suppressed and are, thus, admitted. Thus, the filtering has the effect that precrash severity indicators having an equally high or lower priority than the priority of the previous precrash severity indicator no longer occur for a certain period of time.

The intermittent suppression of precrash severity indicators is carried out preferably with the aid of a countdown timer (that is, a timer) in the manner described below. If a precrash severity indicator is set, then or shortly thereafter the timer is set to a predefined value. During or after the occurrence of the precrash severity indicator, the start of the timer from the predefined value to an end value (for example, 0) is then initiated. For example, the timer begins to run at the pulse end of the precrash severity indicator. As long as the timer is running, all of the precrash severity indicators having an equally high or lower priority than the priority of the precrash severity indicators triggering the timer are suppressed. This feature will be elucidated below by example with reference to FIG. 2.

The countdown timer is preferably reset to the starting value—that is, is rewound—when a precrash severity indicator having an equally high or lower priority than the priority of the previous precrash severity indicator occurs before the timer has run down (that is, before the end value is reached). This resetting of the timer before it expires allows the suppression period to be extended, as compared to a form of implementation without resetting prior to expiring.

For example, when safety-critical events that are identical in nature occur in succession (such as oversteering maneuvers), the associated precrash severity indicator for the first of these events is set only once; for all subsequent events the associated precrash severity indicator is suppressed, as long as the break between the individual events does not exceed a period of time (that is, the predefined running time of the timer)—that is, as long as the timer does not reach its end value. In this case the time period can be parameterized. For example, each precrash severity indicator can be given its own time period (that is, the running time of the timer).

The system can respond in an adaptive manner to the prehistory by means of the time constants that are used, a feature that is especially advantageous for driving in the top speed range.

Optionally, the precrash severity indicator with the highest priority (here PCS 8) can be treated, in particular, in such a way that this precrash severity indicator is not suppressed, in contrast to the other precrash severity indicators, if this precrash severity indicator is set multiple times one after the other. Then, for example, for several precrash severity indicators PCS 8 that are activated in succession the second to the nth precrash severity indicator PCS 8 are not filtered out. This property can be used for extremely critical driving states that are supposed to trigger the associated occupant protection measure every time.

Then the filtered precrash severity indicators PCS' 1-8, which are available at the output of block 40, are used to trigger the respectively assigned various reversible occupant protection measures 51-54 of the precrash safety system, so that the result shown in FIG. 1 by means of the depicted arrows is one example of an assignment of the precrash severity indicators PCS' 1-8 to the occupant protection measures 51-54.

Thus, for example, the filtered precrash severity indicator PCS' 1 triggers the belt tensioner with a predetermined force/time curve 1 (see reference numeral 51); in this case it involves, for example, a slowly rising force progression with a small amount of force after the maximum value. Examples of various force/time curves of belt tensioners can be found in the document DE 10 2005 038 226 A1. The filtered precrash severity indicator PCS' 2 triggers the belt tensioner with the predetermined force/time curve 2 (see reference numeral 52); in this case it involves, for example, a rapidly rising force progression with a small amount of force after the maximum value. At the same time the filtered precrash severity indicator PCS' 2 additionally triggers the closing of the windows and a sliding roof that may be present as well as a seat adjustment (see reference numeral 54). In this context the headrest is moved into the upright position—for example, starting from a current angle of 45° to an angle of 70° relative to the horizontal.

Figure 2:
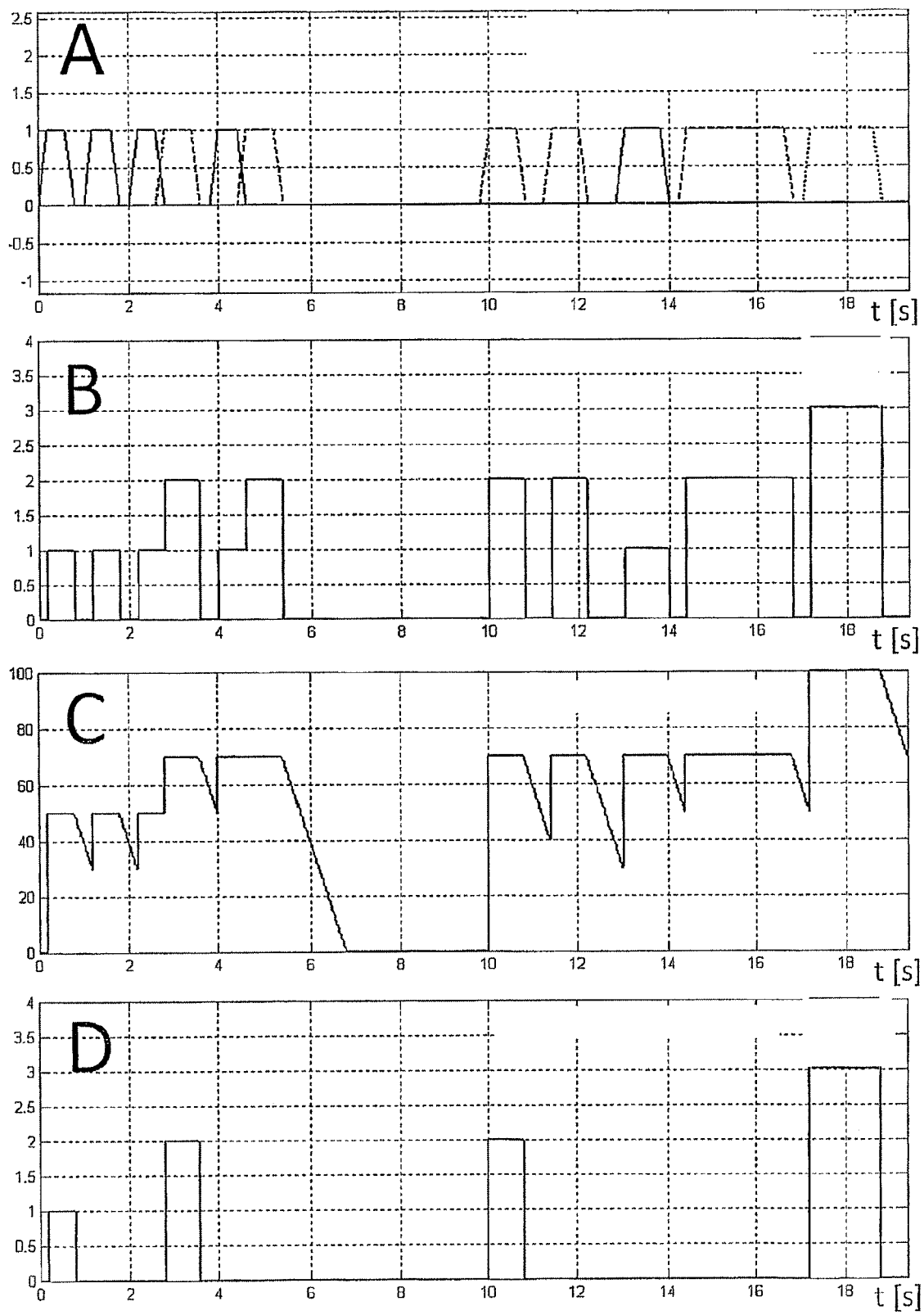
FIG. 2 shows four diagrams A, B, C and D that depict by way of example the signal progression of selected signals from FIG. 1.

FIG. 2 shows four diagrams A, B, C and D depicting by way of example the signal progression of selected signals from FIG. 1.

Diagram A shows by way of example the progressions for the signal 11 (continuous line), the signal 12 (dashed line) and the signal 13 (dotted line). In this case the signals 11, 12 and 13 are binary signals.

Diagram B shows the precrash severity indicators assigned to the progressions of the signals 11, 12 and 13. Thus, a pulse of the signal 11 triggers a precrash severity indicator with the priority value 1 (PCS 1), a pulse of the signal 12 triggers a precrash severity indicator with the priority value 2 (PCS 2) and a pulse of the signal 13 triggers a precrash severity indicator with the priority value 3 (PCS 3).

Diagram C shows the progression of the timer, where the various precrash severity indicators are assigned different timer starting values. Thus, the precrash severity indicator 1 (PCS 1) is assigned a timer starting value of 50, the precrash severity indicator 2 (PCS 2) is assigned a timer starting value of 70 and the precrash severity indicator 3 (PCS 3) is assigned a timer starting value of 100. It is clear from diagram C that when a precrash severity indicator is set, the timer is set to the corresponding timer value. At the end of the respective pulse width of the precrash indicator the timer starts to run (see, for example, the starting to run at time t≈0.8 sec.). If precrash severity indicators having an equally high or lower value occur in the period of time before the timer has run down, the timer is reset again to the timer starting value (see, for example, the resetting of the timer at time t≈1.2 sec.). In this respect it must be ensured that the timer is reset to that starting value, from which the timer last started (see, for example, the resetting to the timer starting value of 70, instead of 50, for a precrash severity indicator having a priority of 1 at the time t≈4 sec.).

As long as the timer is running, all precrash severity indicators having an equally high or lower priority are suppressed. This feature is shown in diagram D, which shows the filtered precrash severity indicators.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling at least one reversible occupant protection measure of a motor vehicle precrash safety system, the method comprising the acts of:
    receiving a plurality of input signals, wherein the input signals indicate a potential risk of an accident;
    mapping the plurality of input signals onto a plurality of different precrash severity indicators, wherein each precrash severity indicator indicates at least one of an expected probability and a severity of the accident, the precrash severity indicators being set as a function of the input signals;
    filtering the plurality of precrash severity indicators such that, for a determined period of time, any precrash severity indicator having an equally high or lower priority than a priority of a previous precrash severity indicator is suppressed; and
    controlling, without regard to any precrash severity indicators that have been suppressed, the at least one reversible occupant protection measure of the motor vehicle as a function of the filtered precrash severity indicators.

2. The method according to claim 1, wherein the at least one reversible occupant protection measure is a safety belt tensioning.

3. The method according to claim 2, wherein at least two of the filtered precrash severity indicators are assigned different force progressions of an electric motor that operates the safety belt tensioning.

4. The method according to claim 1, wherein the plurality of precrash severity indicators have different priorities, and the act of filtering comprises:
    admitting a precrash severity indicator having a higher priority than the priority of the previous precrash severity indicator.

5. The method according to claim 1, wherein the occurrence of the particular precrash severity indicator initiates a start of a countdown timer.

6. The method according to claim 5, wherein the precrash severity indicators have different priorities, the method further comprising the act of:

resetting the countdown timer when a precrash severity indicator having an equally high or lower priority than the priority of the previous precrash severity indicator occurs before an expiration of the countdown timer.

7. The method according to claim 1, wherein the precrash severity indicators have different priorities, and subsequent precrash severity indicators having a same priority as the priority of the previous precrash severity indicator are suppressed for as long as the time period between occurrences of individual precrash severity indicators does not exceed a predetermined time period.

8. The method according to claim 7, wherein the time period of the suppression is a function of an occurring precrash severity indicator.

9. The method according to claim 1, wherein the at least one reversible occupant protection measure comprises one or more of:

belt tensioning;

closing of windows;

closing of a sliding roof; and seat adjustment.

10. The method according to claim 1, wherein each filtered precrash severity indicator, or each filtered precrash severity indicator from a subset of filtered precrash severity indicators, is assigned one or more occupant protection measures of the motor vehicle precrash safety system.

11. The method according to claim 1, wherein at least one of the plurality of input signals is at least one of a driving dynamics-related sensor signal and an environment sensing signal.

12. The method according to claim 11, wherein the at least one of the driving dynamics-related sensor signal and the environment sensing signal relates to at least one of the following events:

understeering;

oversteering;

emergency braking;

presence of a deceleration request from a brake assistant of the motor vehicle;

intervention of the brake assistant in order to reinforce a driver's deceleration request;

a potentially imminent collision based on radar data;

a potentially imminent collision based on camera data;

a collision that is occurring; and a rollover of the motor vehicle that is occurring.

13. A motor vehicle precrash safety system, comprising:

at least one reversible occupant protection mechanism of a motor vehicle;

a control device for controlling the at least one reversible occupant protection mechanism, wherein:

the control device receives a plurality of input signals, said input signals indicating a potential risk of an accident;

the control device maps the plurality of input signals onto a plurality of different precrash severity indicators, each precrash severity indicator indicating at least one of an expected probability and a severity of an accident, and the precrash severity indicators being set as a function of the input signals;

the control device filters the precrash severity indicators such that, for a determined period of time, any precrash severity indicator having an equally priority than a priority of a previous precrash severity indicator is suppressed; and the control device actuates the at least one reversible occupant protection measure as a function of the filtered precrash severity indicators and without regard to any precrash severity indicators that have been suppressed.

* * * * *